Figure 1:
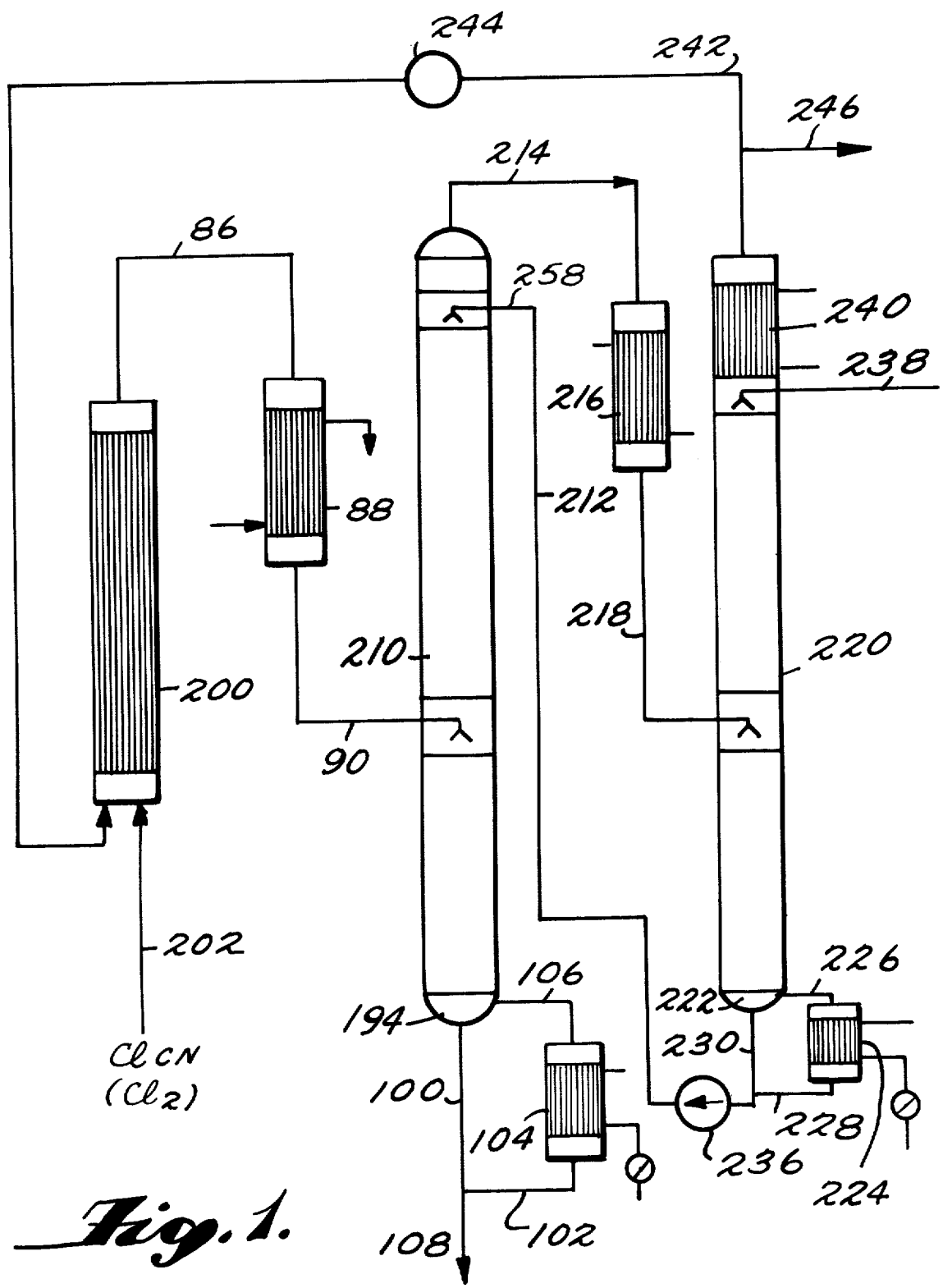

United States Patent [19]

Geiger et al.

[11] 3,925,377

[45] Dec. 9, 1975

[54] PROCESS FOR PRODUCTION OF CYANURIC CHLORIDE

[75] Inventors: Friedhelm Geiger, Grossauheim; Werner Heimberger; Gerd Schreyer, Grossauheim; Wolfgang Weigert, Offenbach, all of Germany

[73] Assignee: Deutsche Gold- und Silber-Scheideanstalt vormals Roessler, Germany

[22] Filed: June 26, 1974

[21] Appl. No.: 483,454

[30] Foreign Application Priority Data

June 27, 1973  Germany............................ 2332636

[52] U.S. Cl............................................. 260/248 C
[51] Int. Cl.$^2$...................................... C07D 251/28
[58] Field of Search ............................... 260/248 C

[56] References Cited
UNITED STATES PATENTS

| | | | |
|---|---|---|---|
| 2,742,977 | 4/1956 | Williams | 260/248 UX |
| 3,607,671 | 9/1971 | Riethmann et al. | 260/248 |

FOREIGN PATENTS OR APPLICATIONS

| | | |
|---|---|---|
| 1,670,026 | 3/1972 | Germany |
| 2,106,675 | 9/1971 | Germany |

*Primary Examiner*—John M. Ford
*Attorney, Agent, or Firm*—Cushman, Darby & Cushman

[57] ABSTRACT

There is provided a process for the recovery of liquid cyanuric chloride from a mixture formed by the trimerization of cyanogen chloride in a trimerization reactor with subsequent fractionation of said mixture comprising conducting the mixture in an at least partially gaseous condition at 146° to 500°C. to a column system, bringing said mixture in a first fractionating column into contact with a solvent for cyanuric chloride having a boiling point between that of cyanogen chloride and that of cyanuric chloride and which is stable to cyanuric chloride, cyanogen chloride, chlorine and hydrogen chloride, recovering condensed liquid cyanuric chloride from the bottom of said first column at a temperature above the boiling point of said solvent, removing the distillate mixture containing solvent, cyanogen chloride, chlorine and any carbon dioxide, nitrogen and hydrogen chloride from the top of said first column, partially condensing a portion of said distillate and returning said partial condensate to the top of the first fractionating column, leading the solvent containing residual gas of chlorine, cyanogen chloride and any carbon dioxide, nitrogen and hydrogen chloride present to a second fractionating column adding sufficient liquid cyanogen chloride to the top of said second column to maintain a reflux in the top of said second column, removing a mixture of chlorine and cyanogen chloride and any carbon dioxide, nitrogen and hydrogen chloride free of said solvent from the top of said second column, returning the chlorine and cyanogen chloride to the trimerization reactor, insuring that the gas entering said reactor contains at least 50 weight percent cyanogen, collecting chlorine and cyanogen chloride free solvent in the bottom of the second column and returning it to the top of the first fractionating column.

9 Claims, 2 Drawing Figures

PROCESS FOR PRODUCTION OF CYANURIC CHLORIDE

Cyanuric chloride is known to be formed by trimerization of cyanogen chloride in the presence of acid catalysts such as mineral acids or surface active catalysts such as activated carbon (Ullman Encyzklopadie der technischen Chemie, Vol. 5 (1954), pages 624–626).

Cyanuric chloride in connection with the trimerization is recovered by desublimation processes in crystalline form. These desublimation processes were very expensive because of the great mechanical load of the apparatus and the regularly occurring disturbances as a result thereof (German Offenlegungsschrift 1,809,194).

Therefore, those in the art have changed to separating cyanuric chloride as a liquid from the trimerization mixture under specific conditions and to return again the residual gases, which still contain cyanuric chloride, directly into the trimerization reactor (German Offenlegungsschrift 2,106,675).

Thereby it is only possible to condense about two-thirds of the cyanuric chloride present; the rest remains in the waste gas. To be sure, this is returned to the trimerization reactor. However, it is enriched in the course of time with foreign gases (carbon dioxide, phosgene, cyanogen, carbon tetrachloride and hydrogen chloride) and above all chlorine and must be discharged from the cycle. It goes without saying that cyanuric chloride and cyanogen chloride also must pass out of the system. Therefore, these waste gases must either be destroyed or worked up in some form which requires additional expenditures.

According to a known process for the recovery of liquid cyanuric chloride (German Offenlegungsschrift 1,809,194) this residual third of the cyanuric chloride contained in the waste gases is washed out of the waste gases, specifically with phosphorus oxychloride inside the separatory column for the cyanuric chloride. However, there accumulates thereby cyanuric chloride which is colored and impure due to the by-products present.

Furthermore, it is known to first dissolve the cyanuric chloride out of the waste gas with a solvent such as carbon tetrachloride, which is not attacked by chlorine but which is, however, only a poor solvent for cyanuric chloride and to transfer the cyanuric chloride dissolved therein in an additional column into another solvent, see German Offenlegungsschrift 1,670,026. The industrial expense in this process is very great and cumbersome through the use of two different solvents.

It has now been found that cyanuric chloride can be recovered quantitatively and thereby in a very simple industrial manner in liquid form from the gaseous or partially condensed trimerization product mixture in a fractionating column if the mixture in gaseous or partially condensed form coming from the trimerization reactor having a temperature of 146° to 500°C. is led into a column system and in a first fractionating column is brought into contact with a solvent whose boiling point lies between that of cyanogen chloride and cyanuric chloride (i.e., between about 12.66° and 190°C.) and which is stable to cyanuric chloride, cyanogen chloride, chlorine and hydrogen chloride if the latter is also present, whereupon the condensed cyanuric chloride is drawn off from the sump of the column, the mixture that distilled over is partially condensed, the partial condensate returned to the top of the column and the solvent containing residual gas of chlorine, cyanogen chloride and eventually carbon dioxide, nitrogen and hydrogen chloride is led to a second fractionating column at the top of which sufficient liquid cyanogen chloride is given up to maintain a reflux so that the mixture of chlorine and cyanogen chloride and perhaps carbon dioxide, nitrogen and hydrogen chloride is solvent free, whereupon this mixture, as far as it is free of nitrogen and carbon dioxide, is led directly (as far as it contains the named gases after a water wash to separate nitrogen and carbon dioxide) to the cyanogen chloride forming reactor and/or so much of this mixture, whether or not it contains nitrogen or carbon dioxide, is led to the trimerization reactor that the total gases entering the trimerization reactor still contains at least 50 weight percent cyanogen chloride and the chlorine and cyanogen chloride free solvent accumulating in the sump of the second column, in a given case after treatment with aqueous alkali, e.g., sodium hydroxide or potassium hydroxide, is returned again to the top of the first fractionating column. It is also possible to return directly to the second column the residual gas accumulating at the top of the first column.

Cyanogen chloride can be added either free of carbon dioxide and nitrogen or hydrogen chloride or in admixture with these materials depending on whether it is obtained by catalytic chlorination of gaseous hydrogen cyanide, see Belgian Pat. No. 779,690 and Geiger et al. U.S. application Ser. No. 302,419 filed Oct. 31, 1972 now U.S. Pat. No. 3,839,543 and subsequent purification by absorption and distillation, see Geiger et al. U.S. Pat. No. 3,618,295, or by chlorination of an aqueous solution of hydrogen cyanide, see Ullmann, Enzyklopadie der technischen Chemie, Vol. 5 (1954), page 66.5. There can also be added cyanogen chloride formed in an aqueous system by oxidation of hydrogen cyanide with hydrogen peroxide/hydrochloric acid and in the presence of a cupric ion system which also preferably contains ferric ions, see Belgian Pat. No. 768,080 and Heilos et al. U.S. application Ser. No. 153,467, filed June 2, 1971 and now abandoned and continuation-in-part Heilos et al. U.S. application Ser. No. 264,455, filed June 20, 1972 now U.S. Pat. No 3,840,648. The entire disclosures of Heilos U.S. application Ser. No. 153,467 and Heilos U.S. application Ser. No. 264,455 are hereby incorporated by reference.

As solvents which have boiling points between that of cyanogen chloride and cyanuric chloride which at the same time are stable to cyanogen chloride, chlorine, cyanuric chloride and, if necessary hydrogen chloride.

There can be used nuclear halogenated benzotrifluoride or polyhaloalkanes containing a plurality of fluorine atoms.

The nucleus of halogenated and trifluoromethyl group halogenated compounds can have the formulae:

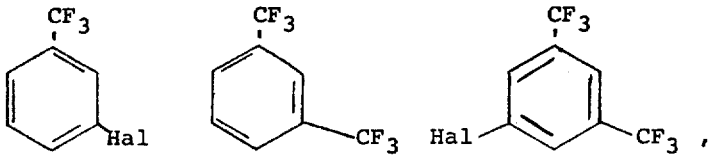

for example. Hal is normally a halogen of atomic weight 9 to 80. Thus there can be used m-chlorotrifluorotoluene(1,1,1-trifluoromethyl-3-chlorobenzene) m-fluorotrifluorotoluene, m-bromo-trifluorotoluene, m-hexafluoroxylene(1,1,1-trifluoromethyl-3,3,3-trifluoromethyl)benzene, 5-chlorohexafluoroxylene(1,1,1-trifluoromethyl-3,3,3-trifluoromethyl-5-chlorobenzene), and the corresponding 5-bromohexafluoroxylene and 5-fluorohexafluorotoluene, benzotrifluoride, o-chlorotrifluorotoluene, p-chlorotrifluorotoluene, p-hexafluoroxylene, o-hexafluoroxylene, 4-chloro-1,1,1-trifluoromethyl-3,3,3-trifluoromethyl benzene, 2-chloro-1,1,1-trifluoromethyl-3,3,3-trifluoromethyl benzene. Especially preferred are m-chlorotrifluorotoluene (m-chlorotrifluoromethyl benzene) and hexafluoroxylene(m-1,1,1-trifluoromethyl-3,3,3-trifluoromethyl) benzene. The halogen in the nucleus of the nuclear halogenated benzotrifluoride generally has an atomic weight of 9 to 80. Examples of polyfluorohaloalkanes are: difluorotetrachloroethane, trifluoropentachloropropane, perfluorooctane or mixtures of these materials.

If there is used as the starting material for forming cyanuric chloride cyanogen chloride which is produced from an aqueous solution of hydrogen cyanide then there results at the head of the second column, i.e., the solvent purification column, a chlorine-cyanogen chloride mixture contaminated with carbon dioxide and in a given case nitrogen which must be subjected to a water wash. Thereby there is formed an aqueous solution of chlorine and cyanogen chloride which can be recycled into the cyanogen chloride forming reactor while carbon dioxide and nitrogen are released to the atmosphere.

The chlorine-cyanogen chloride mixture resulting at the top of the second column can also be recycled directly into the trimerization reactor. However, by using these means of action, there results in time an enrichment in chlorine, as well as in a given case of carbon dioxide and nitrogen, so that only so much can be returned into the trimerization reactor that the total gas entering the trimerization reactor contains at least 50 weight percent cyanogen chloride.

The purified solvent accumulating in the sump of the second column can be returned immediately to the top of the first column.

Should non volatile but disturbing impurities for the recovery of pure cyanuric chloride collect in the sump of the second column, then these can be removed quantitatively from the solvent in a simple manner by washing with aqueous alkalis such as alkali hydroxide and carbonates, e.g., sodium hydroxide, potassium hydroxide, sodium carbonate and potassium carbonate. The washing is preferably carried out in a customary liquid-liquid extraction column at temperatures between 20° and 80°C. The concentration of added alkali in the aqueous solution is between 1 and 10 weight percent.

The pressure is not critical for the liquid separation of cyanuric chloride or for the purification of the solvent. Both process steps can be carried out for example without difficulty at 0.5 to 3 atomspheres (absolute); preferably, however, they are carried out at atmospheric pressure.

The industrial advantage of the process of the invention is first in the recovery of completely pure cyanuric chloride in practically quantitative yields and furthermore in the quantitative utilization of excess chlorine and unreacted cyanogen chloride. It is also very substantial that no loss of solvent occur. Besides the process is very favorable to the environment since no gases injurious to health are released to the atmosphere.

As fractionating columns in the process of the invention there can be used either packed columns or columns with corresponding installations of bubble cap plates or perforated plates.

Figure 2:
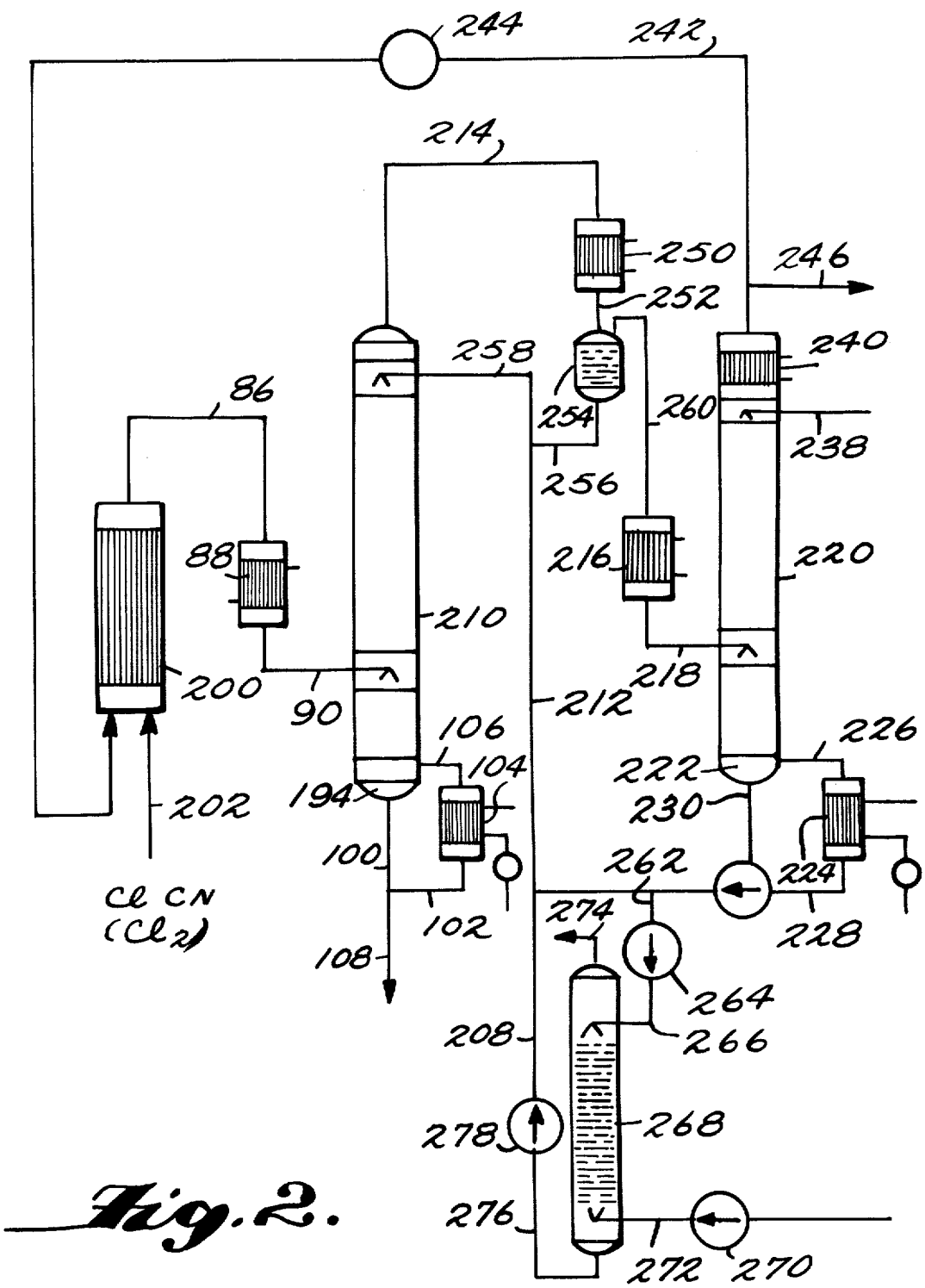

The invention will be understood best in connection with the drawings wherein:

FIG. 1 is a diagrammatic illustration of the process for recovery of cyanuric chloride; and FIG. 2 is a diagrammatic illustration of a modified process for the recovery of cyanuric chloride.

In the drawings like numerals indicate like parts. Unless otherwise indicated all parts and percentages are by weight.

EXAMPLE 1

Referring to FIG. 1 cyanogen chloride and chlorine enter trimerization reactor 200 through line 202. The cyanuric chloride vapor leaving the top of reactor 200 goes by line 86 to heat exchanger 88 and is cooled to about 200°C. with the production of steam. The cooled cyanuric chloride goes by line 90 into the middle of column 210. Simultaneously with the help of lines 212 and 258 solvent, for example, m-chlorotrifluorotoluene, is delivered to the top of column 210. The gases such as residual cyanogen chloride, excess chlorine, as well as any foreign gases such as carbon dioxide, nitrogen or hydrogen chloride still contained in the trimerization mixture are washed free of cyanuric chloride in the concentrating (upper) part of column 210 and leave the top of column 210 by way of line 214. Because of heat of condensation of cyanuric chloride set free the solvent is vaporized and likewise leaves the top of column 210 by way of line 214. The liquified cyanuric chloride collects in the sump 194 of column 210 and can be drawn off over lines 100 and 108. In order to obtain liquid cyanuric chloride completely free of solvent, the sump is held at a temperature of 196° to 200°C. with the help of circulatory evaporator 104.

The vapor mixture of solvent, cyanogen chloride, chlorine and any foreign gases leaving column 210 by line 214 are cooled in heat exchanger 216 to about 100°C. and are led over line 218 to the middle of solvent purification column 220. The purified solvent collecting in the sump 222 is held at the boiling point with the help of circulatory evaporator 224. A portion of the solvent leaving the sump 222 through line 230 goes via line 228 to the evaporator 224 where it is heated and returned to the sump through line 226. When the solvent is technical grade m-chlorotrifluorotoluene the boiling point is 138° to 140°C. Solvent is continuously recycled to the top of column 210 with the help of pump 236 and lines 212 and 258. At the top of the purification column 220 so much liquid cyanogen chloride is fed through line 238 that there is present a sufficient reflux of cyanogen chloride and that the residual gas mixture if cyanogen chloride, chlorine, as well as if present carbon dioxide, nitrogen and hydrogen chloride leaving the dephlegmator 240 is free of solvent.

In order to completely utilize the cyanogen chloride content of the residual gas it can be recycled over line 242 with the help of blower 244 into the trimerization reactor 200.

If the residual gas is free of carbon dioxide and nitrogen, however, the residual gas without further purification for the complete utilization of the chlorine and cyanogen chloride is led back into the reactor for the catalytic chlorination of hydrogen cyanide via line 246 in a manner similar to that shown in FIG. 2, line 122.

If the residual gas still contains carbon dioxide as well as nitrogen, then it is treated with water in an absorption column whereby chlorine, cyanogen chloride and, if present, hydrogen chloride are dissolved and the aqueous solution led to the reactor for chlorination of aqueous hydrogen cyanide or the reactor for oxidation of hydrogen cyanide with hydrogen peroxide/hydrochloric acid, while the foreign gases carbon dioxide and nitrogen are released to the atmosphere at the top of the absorption column (not shown).

In the manner described in a column 210 (interior width 60 mm, length of distillation portion 1,500 mm., length of concentrating portion 1,750 mm) filled with glass Raschig rings there were separated up to 5 kg per hour of pure, liquid cyanuric chloride. Simultaneously, there were fed per hour 7 to 8 kg of m-chlorotrifluorotoluene as solvent to the top of column 210 and solvent distilling over together with cyanogen chloride and chlorine was purified in a packed column 220 (interior width 50 mm, length of distillation portion 1500 mm, length of concentrating portion 4,000 mm) with the addition of liquid cyanogen chloride to the head of the column. Half of the gaseous mixture accumulating from the dephlegmator 240 was returned via line 242 into the trimerization reactor 200 while the other half was led off over line 246. There was added hourly to the top of column 220 liquid cyanogen chloride in an amount of 250 grams.

As starting materials for forming cyanuric chloride there were used both cyanogen chloride produced by chlorination of an aqueous solution of hydrogen cyanide and cyanogen chloride produced by catalytic (graphite) chlorination of gaseous hydrogen cyanide. In the first case, the residual gas taken off over line 246 and having a composition of 23.9 weight percent of cyanogen chloride, 47.5 weight percent chlorine, 27.5 weight percent carbon dioxide and 1.1 weight percent nitrogen was subjected to a water wash and the aqueous solution of cyanogen chloride and chlorine formed pumped into the cyanogen chloride forming reactor. In the second case, the residual gas with the help of a blower without further purification was pushed directly into the cyanogen chloride forming reactor. The yields of separated liquid cyanuric chloride amounted to nearly 100 percent based on the chlorine and hydrogen cyanide added for the production of cyanogen chloride.

EXAMPLE 2

Using the apparatus of FIG. 1 the process of Example 1 was repeated by the gaseous trimerization mixture was condensed by cooling partially in heat exchanger 88 to 150°C. and thereby producing steam. Otherwise the results were the same as in Example 1 even in regard to purity and yield as in Example 1.

EXAMPLE 3

Using the apparatus of FIG. 2 (except for the piston pump cycle) the process was carried out as described in Example 1. However, the gaseous mixture of solvent, cyanogen chloride, chlorine and foreign gases leaving column 210 by line 214 was cooled to 110°C. in heat exchanger 250, the mixture passed via line 252 to separatory vessel 254 where it was separated into vapor and condensate. The condensate was returned via line 256 and line 258 to the top of column 210 while the residual gases which always still contain solvent are passed via line 260 to heat exchanger 216 where they are cooled to 60°–80°C. and then go via line 218 to column 220. In regard to purity and yield of cyanuric chloride there were obtained the same results as in Example 1.

EXAMPLE 4

The process was carried out as in Example 1 except that there was used the apparatus of FIG. 2. A partial stream of purified solvent was conducted over line 262, piston pump 264 and line 266 to extraction column 268 and simultaneously there was introduced into the extraction column a 5 percent aqueous soda lye by way of pump 270 and line 272. The spent soda lye was withdrawn via line 274 while the purified solvent was returned via line 276, piston pump 278 and line 280 to line 212.

In regard to yield and purity of the cyanuric chloride, there were obtained the same results as in Example 1 even after 4 months of operation.

What is claimed is:

1. A process for the recovery of liquid cyanuric chloride from a mixture formed by the trimerization of cyanogen chloride in a trimerization reactor with subsequent fractionation of said mixture comprising conducting the mixture in an at least partially gaseous condition at 146° to 500°C. to a column system, bringing said mixture in a first fractionating column into contact with a solvent for cyanuric chloride having a boiling point between that of cyanogen chloride and that of cyanuric chloride and which is stable to cyanuric chloride, cyanogen chloride, chlorine and hydrogen chloride, recovering condensed liquid cyanuric chloride from the bottom of said first column at a temperature above the boiling point of said solvent, removing distillate mixture containing solvent, cyanogen chloride, chlorine and any carbon dioxide, nitrogen and hydrogen chloride from the top of said first column, partially condensing a portion of said distillate and returning said partial condensate to the top of the first fractionating column, leading the solvent containing residual gas of chlorine, cyanogen chloride and any carbon dioxide, nitrogen and hydrogen chloride present to a second fractionating column adding sufficient liquid cyanogen chloride to the top of said second column to maintain a reflux in the top of said second column, removing a mixture of chlorine and cyanogen chloride and any carbon dioxide, nitrogen and hydrogen chloride free of said solvent from the top of said second column, returning the chlorine and cyanogen chloride to the trimerization reactor, insuring that the gas entering said reactor contains at least 50 weight percent cyanogen chloride, collecting chlorine and cyanogen chloride free solvent in the bottom of the second column and returning it to the top of the first fractionating column.

2. A process according to claim 1, wherein said residual gas contains carbon dioxide and is washed with water to remove nitrogen and carbon dioxide prior to returning the chlorine and cyanogen chloride mixture to the trimerization reactor.

3. A process according to claim 1 wherein the residual gas is free of carbon dioxide and nitrogen and is returned directly to the trimerization reactor from the top of said second fractionating column.

4. A process according to claim 1 wherein a portion of the liquid cyanuric chloride recovered from the bottom of said first column is heated to above the boiling point of said solvent and is returned to the bottom of said first column to maintain the temperature at the bottom of the first column above the boiling point of said solvent.

5. A process according to claim 1 wherein the solvent is selected from the group consisting of nuclear halogenated benzotrifluoride, trifluoromethyl group containing aromatic hydrocarbons, trichlorotrifluoroethane, difluorotetrachloroethane, trifluoropentachloropropane and perfluorooctane.

6. A process according to claim 1 wherein the solvent is a compound of the formula:

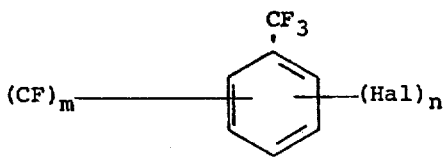

wherein:
$m$ is 0 or 1;
$n$ is 0 or 1;
the total of $m + n$ is 1 or 2; and
the halogen has an atomic weight of 9 to 80.

7. A process according to claim 6 wherein the solvent is m-chlorotrifluorotoluene or hexafluoroxylene.

8. A process according to claim 1 wherein the solvent obtained from the second column is treated with aqueous alkali before returning it to the top of the first column.

9. A process according to claim 8 wherein the aqueous alkali is an alkali hydroxide or alkali carbonate and the treatment therewith is at 20° to 80°C.

* * * * *